United States Patent [19]

DellaVecchia

[11] Patent Number: 5,465,987
[45] Date of Patent: Nov. 14, 1995

[54] FOLDING HANDTRUCK ATTACHMENT

[76] Inventor: Joseph A. DellaVecchia, 3734 Orchard Ave., Bensalem, Pa. 19020

[21] Appl. No.: 327,702

[22] Filed: Oct. 24, 1994

[51] Int. Cl.⁶ ...................................................... B62B 1/12
[52] U.S. Cl. .................................. 280/47.28; 280/47.26; 280/47.18
[58] Field of Search ........................... 280/47.26, 47.27, 280/47.28, 47.18, 47.2, 47.29

[56] References Cited

U.S. PATENT DOCUMENTS

| | | | |
|---|---|---|---|
| 1,006,985 | 10/1911 | Smith | 280/47.29 |
| 2,964,328 | 12/1960 | Muir | 280/47.26 |
| 3,052,323 | 9/1962 | Hopfeld | 280/47.29 |
| 3,436,093 | 4/1969 | Ruffley, Jr. | 280/47.27 |
| 3,460,850 | 8/1969 | Franklin | 280/47.26 |
| 4,726,602 | 2/1988 | Sanders et al. | 280/47.2 |
| 5,123,666 | 6/1992 | Moore | 280/47.28 |
| 5,125,675 | 6/1992 | Engelbrecht | 280/47.26 |
| 5,193,842 | 3/1993 | Fontenot | 280/47.26 |

FOREIGN PATENT DOCUMENTS 2335384  7/1977  France .

*Primary Examiner*—Margaret A. Focarino
*Assistant Examiner*—Carla Mattix
*Attorney, Agent, or Firm*—Gregory J. Gore

[57] ABSTRACT

A carrier attachment for a handtruck is comprised of a simple, foldable, detachable panel system to laterally support and tightly secure carried articles. A back plate and two side plates, interconnected by hinges, may be secured against a carried load by straps that extend across the front of the two side plates. The hinges are restricted to 90-degrees of movement. The back plate includes hang brackets on its rear side which are fitted over horizontal cross braces of the truck frame to attach the carrier. The carrier may be easily collapsed into a folded position so that the unit is very compact and easily stored.

6 Claims, 2 Drawing Sheets

FOLDING HANDTRUCK ATTACHMENT

FIELD OF THE INVENTION

This invention relates to wheeled, hand-propelled carts, such as a handtruck, for transporting articles. More specifically, it includes an attachment for a handtruck which increases the ease of carrying small articles.

BACKGROUND OF THE INVENTION AND DESCRIPTION OF PRIOR ART

The workman's handtruck is omni-present in today's industrial, cargo-handling environment. The handtruck is a two-wheeled, manually propelled carrier for large boxes and other industrial items which allow the weight of the articles to be lifted and moved easily between locations. The primary component of a handtruck is a support frame, which stands vertical at rest, and includes two side rails. The frame carries a pair of axle-mounted wheels at the bottom, where a toe plate extends horizontally forward. Handles extend from the top of each side rail. In use, articles are stacked on the toe plate and the frame is rocked backwards, tilting on the wheels so that the articles rest against the frame as they are wheeled between locations.

While a small number of large objects can be easily stacked and balanced on the toe plate, a standard handtruck is very difficult to use when handling a large number of small packages or a plurality of elongate items, such as pipes or tubing which cannot be laterally contained from falling off the sides of the handtruck. In order to secure carried articles, handtrucks have employed horizontal straps which wrap around the front of the handtruck. Handtrucks having fixed, rigid sides have also been used to contain articles laterally.

The closest patent art of which the applicant is aware includes U.S. Pat. No. 1,716,611 issued to L. E. Wilson on Jun. 11, 1929. This patent shows a detachable carrier for a handtruck which includes a caged body having hinged side pieces. U.S. Pat. No. 3,436,093 issued to M. F. Ruffley, Jr. on Apr. 1, 1969 shows the use of a specialty handtruck attachment for carrying cylindrical containers. This container-handling attachment is secured to the back of the handtruck by a bracket which hooks over a horizontally-extending brace between vertical frame members.

The prior art device as described above, however, do not provide an efficient means for providing a universal attachment for a standard handtruck which may be used to carry many different types of articles that would otherwise be difficult to transport. It is therefore the primary object of the present invention to provide an accessory for a handtruck which is easily attached and that facilitates transporting a large number of small articles or items which are irregularly shaped.

SUMMARY OF THE INVENTION

In order to fulfill the need in the art described above, the present carrier attachment for a handtruck has been devised. The present invention comprises a simple, foldable, detachable panel system which may be used to laterally support and tightly secure articles loaded onto the handtruck. The present device includes three planar panels which are interconnected by hinges. The panels include a back plate and two side plates that may be secured together by straps across the front of the carrier that extend across the two side plates. The back plate includes hang brackets on its rear side which are fitted over horizontal cross braces of the handtruck frame. Attachment of the present carrier by these hang brackets makes the unit extremely versatile, since it is easy to attach and remove from the handtruck. Furthermore, the hinged sides may be easily collapsed into a folded position so that the unit is very compact and easily stored.

The invention may be more specifically described as a handtruck, comprising: a vertical, ladder-back frame including a plurality of horizontal cross-braces extending between vertical side rails, the frame having handles at the top and a pair of axle-mounted wheels at the bottom; a toe plate affixed to the bottom of the frame and extending substantially horizontally from the front of the frame; and three panels, a back panel and two side panels. The side panels are connected to the rear panels by hinges, the panels being detachably suspended from at least one of the horizontal cross-braces by a plurality of brackets fastened to the rear of the back panel. The handtruck further includes a plurality of angle-bracket stops affixed to the side edges of the back panel. The stops restrict the range of motion of the side panels to a maximum of 90-degrees. At least one strap travels across the front of the handtruck and is detachably affixed between the opposing side plates. A shock-absorbing bumper is located along the bottom edge of the rear panel to vertically support the rear panel and to reduce vibration and rattle. The back plate extends downward beyond the side panels. The panels are planar sheets of metal and the strap may include a hook and loop VELCRO attachment. In an alternate embodiment, the toe plate is connected to the frame by a hinge so that it will fold up for storage.

Other objects, advantages and novel features of the invention will become apparent from the following detailed description of the invention when considered in conjunction with the accompanying drawings and description of the preferred embodiment.

DESCRIPTION OF THE PREFERRED EMBODIMENT

Figure 1:
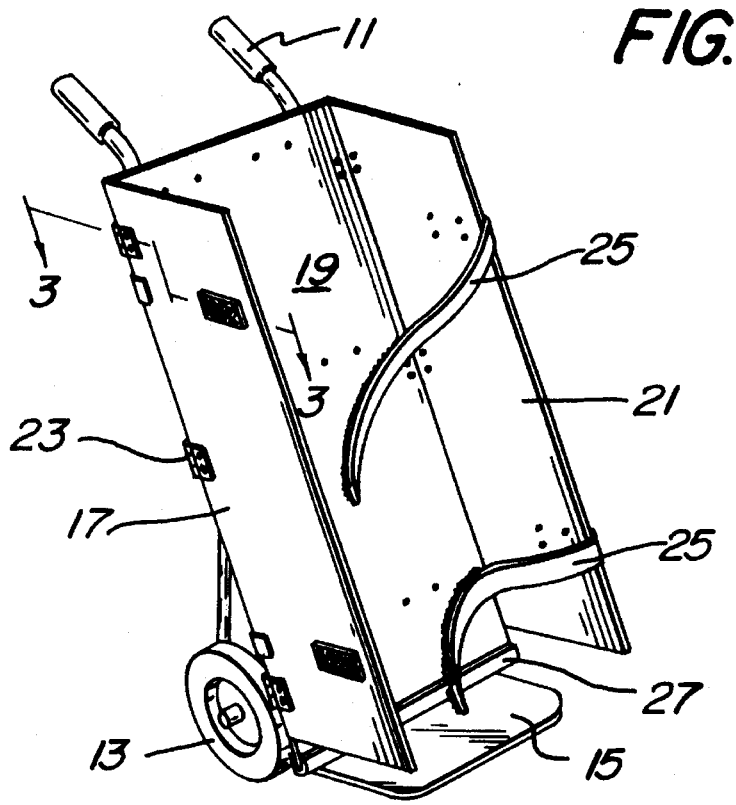
FIG. 1 is a top, left- front isometric view of the present invention.

Referring now to FIG. 1, a standard handtruck is shown with the carrier panels installed. The handtruck shown in this figure includes a main frame with handles 11 at the top and wheels 13 carried on an axle at the bottom, more clearly shown in FIG. 2. A toe plate 15 is also attached to the bottom of the frame. Carrier panels 17, 19, and 21 are interconnected by hinges 23. These panels comprise a back panel 19 and two side panels 17 and 21. Straps 25 may be attached across the front of the opposing side panels to enclose and hold articles between the side panels. A back panel shock-absorbing bumper 27 is fitted along the bottom edge of the back panel for added support and to reduce vibration and rattle. The bumper 27 is preferably a strip of rubber mounted across the bottom edge of the back plate.

Figure 2:
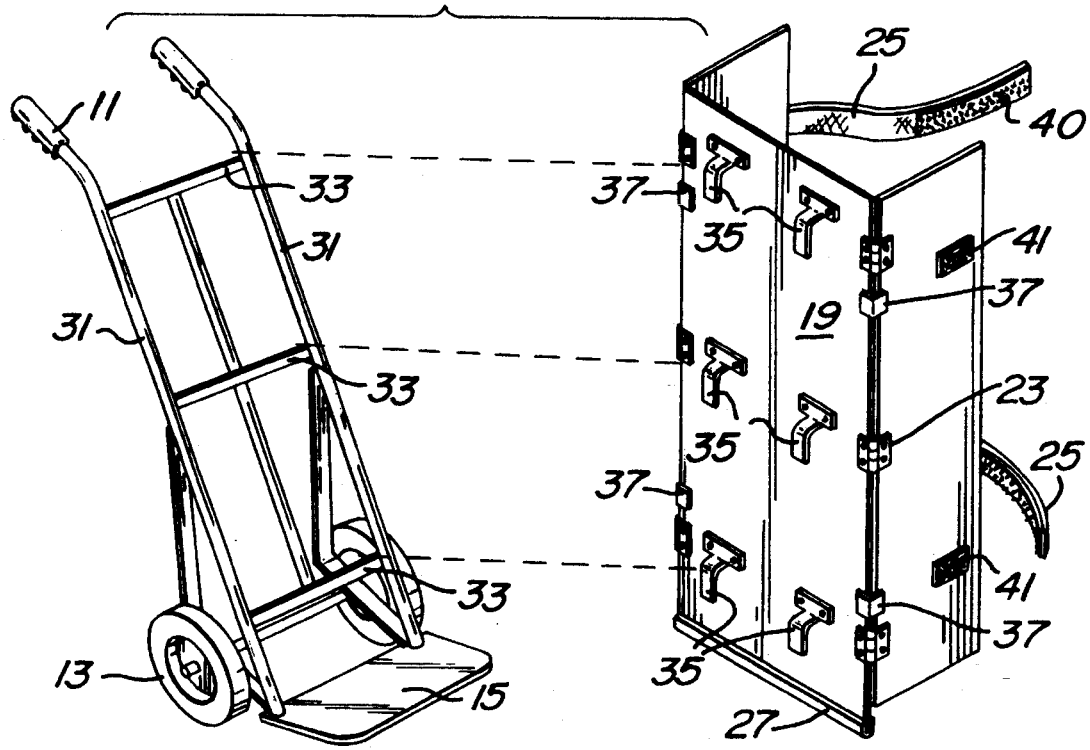
FIG. 2 is a top, front isometric assembly view.

Referring now to FIG. 2, the construction of the handtruck frame and attachment means of the carrier panels are clearly shown. The handtruck frame is of ladder-back construction, including vertical side rails 31 and horizontal cross-braces 33. As shown in this figure, three pairs of hang brackets 35 are affixed to the rear of back panel 19 by hinges 23. When installed on the handtruck, the carrier panels are attached to the truck by way of the hang brackets 35 which are fitted over the horizontal cross-braces of the frame. Vertical support is also supplied by the rear plate bumper 27 which rests on the toe plate 15. The carrier panels thus remain affixed to the handtruck only by the force of gravity. Side panel stops 37 are fixed 90-degree angle brackets located along the hinged joints between pairs of panels. These brackets restrict the range of motion of the side panels relative to the back panel to a maximum of 90-degrees. This is a critical feature of the present invention which enables the handtruck to be easily loaded and to hold the side panels into position for easy attachment of straps 25. Alternatively, the brackets may be replaced by the use of special hinges which include means for restricting their extent of opening to 90-degrees. The straps 25 may include hook and loop VELCRO attachment means 40 which cooperate with other attachment means 41 located on the outside of the opposite side panel. A sufficient length of Velcro® material is included at the ends of the straps so that the length of the straps may be varied to secure the panels firmly against the items being carried.

Figure 3:
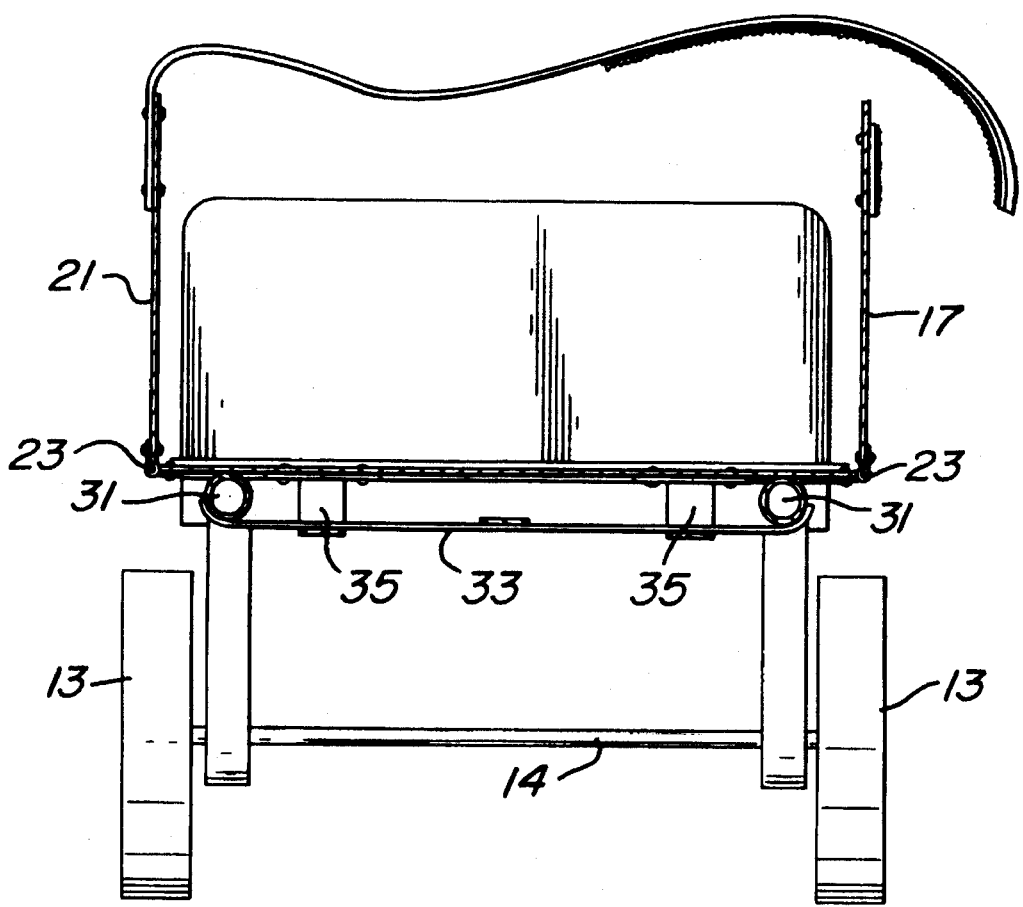
FIG. 3 is a top sectional view taken from FIG. 1 as shown in that figure.

Referring now to FIG. 3, a top view of the present invention is shown. As shown in this figure, the back panel rests directly against vertical side rails 31. Hang brackets 35 are fitted over cross-brace 33 dimensioned so that there is a snug fit between the back panel and the frame members. This view also shows a pair of wheels 13 at the bottom of the frame which are affixed thereto by way of an axle 14. As further shown in this figure, the side panels 17 and 21 are supported by hinges 23 and are opened to their fullest extent of 90-degrees, being restrained only by the angled bracket stops.

Figure 4:
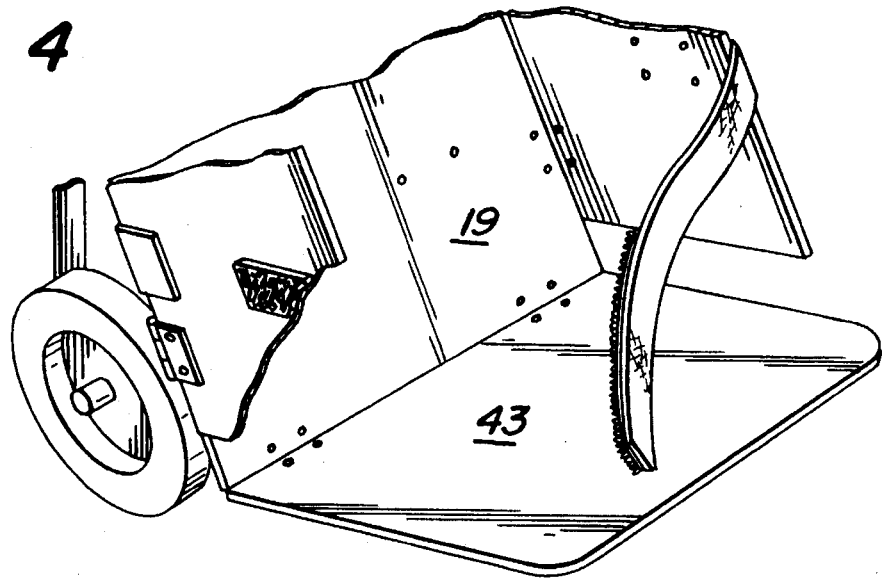
FIG. 4 is a sectional isometric view showing an alternate embodiment of the present invention.

Referring now to FIG. 4, an alternate embodiment of the present invention is shown. In this embodiment, the toe plate 43, a hinged plate affixed to the bottom of the back panel 19, is added. This additional plate may be used to extend the reach of the fixed toe plate of the handtruck.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

What is claim is:

1. A handtruck, comprising:

a vertical, ladder-back frame including a plurality of horizontal cross-braces extending between vertical side rails, said frame having handles at a top and a pair of axle-mounted wheels at a bottom;

a toe plate affixed to the bottom of said frame and extending substantially horizontally from the front of the frame;

three panels, including a back panel and two side panels, said side panels connected to said back panel by hinges, said panels being detachably secured to and quickly removable by lift release from, at least one of said horizontal cross-braces by a plurality of vertically-extending hang brackets fastened to the rear of said back panel, said back panel covering the entire space between all cross-braces; and a shock-absorbing bumper along the bottomed edge of said back panel to vertically support said back panel against said toe plate and to reduce vibration and rattle of the panels.

2. The handtruck of claim 1, further including a plurality of angle-bracket stops affixed to said rear panel along its side edges, said stops restricting the range of motion of said side panels to a maximum of 90-degrees.

3. The handtruck of claim 2, further including at least one strap traveling across the front of said handtruck and detachably affixed between opposing side panels.

4. The handtruck of claim 3, wherein said panels are planar sheets of metal.

5. The handtruck of claim 4, wherein said strap is connected by a hook and loop VELCRO.

6. The handtruck of claim 5, wherein said toe plate is connected to said back panel by a hinge.

\* \* \* \* \*